(12) United States Patent
Stapleton

(10) Patent No.: US 11,790,106 B1
(45) Date of Patent: *Oct. 17, 2023

(54) METHODS FOR PROTECTING DATA

(71) Applicant: Wells Fargo Bank, N.A., San Francisco, CA (US)

(72) Inventor: Jeff J. Stapleton, Arlington, TX (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/723,276

(22) Filed: Apr. 18, 2022

Related U.S. Application Data

(63) Continuation of application No. 16/838,149, filed on Apr. 2, 2020, now Pat. No. 11,308,234.

(51) Int. Cl.
| | |
|---|---|
| *H04L 29/06* | (2006.01) |
| *G06F 21/62* | (2013.01) |
| *G06F 21/64* | (2013.01) |
| *G06F 21/60* | (2013.01) |
| *H04L 9/08* | (2006.01) |
| *H04L 9/00* | (2022.01) |

(52) U.S. Cl.
CPC ........ *G06F 21/6227* (2013.01); *G06F 21/602* (2013.01); *G06F 21/64* (2013.01); *H04L 9/008* (2013.01); *G06F 2221/2141* (2013.01)

(58) Field of Classification Search
CPC .... G06F 21/6227; G06F 21/602; G06F 21/64; H04L 9/008
See application file for complete search history.

(56) References Cited

U.S. PATENT DOCUMENTS

| | | | |
|---|---|---|---|
| 9,722,777 B2 | 8/2017 | Payton et al. | |
| 10,289,816 B1 | 5/2019 | Malassenet et al. | |
| 10,333,696 B2 | 6/2019 | Ahmed | |
| 10,339,038 B1 | 7/2019 | Singh et al. | |
| 10,460,130 B1 | 10/2019 | Chhabra | |
| 10,922,405 B2 | 2/2021 | Yom-Tov et al. | |
| 11,308,234 B1* | 4/2022 | Stapleton | G06F 21/602 |
| 2008/0025514 A1* | 1/2008 | Coombs | G06F 21/33 |
| | | | 380/277 |
| 2011/0314278 A1 | 12/2011 | Taskaya et al. | |

(Continued)

*Primary Examiner* — Mohammad A Siddiqi
(74) *Attorney, Agent, or Firm* — Foley & Lardner LLP

(57) ABSTRACT

Systems and methods utilized to protect data. One method includes maintaining, by a first processing circuit in a production database of a production environment system, ciphertext data associated with a cryptographic function, wherein the production environment system corresponds to a first access level. The method further includes masking, by a second processing circuit in a middle environment system, the ciphertext data using a masking function to generate alternate ciphertext data, wherein the middle environment system is a proxy and communicably coupled with the production environment system over a secure network. The method further includes decrypting, by the second processing circuit in the middle environment system, the alternate ciphertext data utilizing a symmetric key to generate masked cleartext data, and storing, by the second processing circuit in a lower environment system, the masked cleartext data in a lower database, wherein the lower environment system correspond to a second access level.

18 Claims, 7 Drawing Sheets

(56) References Cited

U.S. PATENT DOCUMENTS

| | | |
|---|---|---|
| 2015/0098564 A1* | 4/2015 | Chamley ............... H04L 9/0631 380/28 |
| 2016/0034442 A1* | 2/2016 | Levy .................... H04L 67/565 709/203 |
| 2016/0036584 A1 | 2/2016 | Nikolaenko et al. |
| 2016/0119289 A1* | 4/2016 | Jain ........................ H04L 69/08 726/12 |
| 2017/0024307 A1 | 1/2017 | Peng |
| 2017/0033923 A1* | 2/2017 | Melzani .................. H04L 9/003 |
| 2017/0063526 A1* | 3/2017 | Kahrobaei .............. H04L 9/008 |
| 2017/0161506 A1* | 6/2017 | Gates ....................... G09C 5/00 |
| 2018/0183571 A1 | 6/2018 | Gajek |
| 2018/0278410 A1 | 9/2018 | Hirano et al. |
| 2018/0287785 A1 | 10/2018 | Pfannenschmidt et al. |
| 2020/0053067 A1 | 2/2020 | Harnik et al. |
| 2020/0265159 A1 | 8/2020 | Schmatz et al. |
| 2021/0194668 A1 | 6/2021 | Masters et al. |
| 2021/0194855 A1 | 6/2021 | Radke |

* cited by examiner

METHODS FOR PROTECTING DATA

CROSS-REFERENCE TO RELATED APPLICATIONS AND CLAIM OF PRIORITY

This application is a continuation of U.S. patent application Ser. No. 16/838,149, entitled "Methods for Protecting Data," filed on Apr. 2, 2020, which is incorporated herein by reference in its entirety and for all purposes.

BACKGROUND

The present disclosure relates generally to the field of data protection. Information from data sources can include private or protected information and transferring such information may negatively impact privacy and security.

SUMMARY

Some arrangements relate to a method of protecting data, the method implemented by one or more processing circuits. The method includes maintaining, in a production environment, encrypted data associated with a cryptographic function. Further, the method includes decrypting, in the production environment, the encrypted data to generate cleartext data. Further, the method includes encrypting the cleartext data using a homomorphic encryption function to generate ciphertext data. Further, the method includes masking the ciphertext data using a masking function to generate alternate ciphertext data. Further, the method includes decrypting the alternate ciphertext data to generate masked cleartext data and storing, in a lower environment, the masked cleartext data.

In some arrangements, the production environment is inaccessible to a party having control over the lower environment. In various arrangements, both the production environment and the lower environment are associated with a provider institution, and wherein the production environment is associated with applications available to external parties of the provider institution and the lower environment is associated with applications available to internal parties of the provider institution. In some arrangements, the encrypted data is the cleartext data that is encrypted using the cryptographic function in the production environment, and wherein the encrypted data is associated with a symmetric key. In various arrangements, both the cleartext data and the symmetric key is inaccessible to a party having control over the lower environment, and wherein the party having control over the lower environment executes experiments utilizing the masked cleartext data. In some arrangements, the cleartext data comprises a plurality of data structures, and wherein the encrypted data is encrypted at a data structure level, the data structure level indicative of encrypting each individual data structure of the plurality of data structures. In various arrangements, maintaining the encrypted data in the production environment further comprises executing production environment code that generates the cleartext data and removes the cleartext data. In some arrangements, the cleartext data generated by the production environment code is encrypted with the cryptographic function and stored in the production environment. In various arrangements, the homomorphic encryption function comprises manipulating the cleartext data using a plurality of mathematical operators.

Some arrangements relate to a method of protecting data, the method implemented by one or more processing circuits. The method includes maintaining, in a production environment, ciphertext data associated with a homomorphic encryption function. Further, the method includes masking the ciphertext data using a masking function to generate alternate ciphertext data. Further, the method includes decrypting the alternate ciphertext data to generate masked cleartext data and storing, in a lower environment, the masked cleartext data.

In some arrangements, the production environment is inaccessible to a party having control over the lower environment. In various arrangements, both the production environment and the lower environment are associated with a provider institution, and wherein the production environment is associated with applications available to external parties of the provider institution and the lower environment is associated with applications available to internal parties of the provider institution. In some arrangements, the ciphertext data is cleartext data that is encrypted using the homomorphic encryption function in the production environment, and wherein the ciphertext data is associated with a symmetric key. In various arrangements, both the cleartext data and the symmetric key is inaccessible to a party having control over the lower environment, and wherein the party having control over the lower environment executes experiments utilizing the masked cleartext data. In some arrangements, the cleartext data comprises a plurality of data structures, and wherein the ciphertext data is encrypted at a data structure level, the data structure level indicative of encrypting each individual data structure of the plurality of data structures. In various arrangements, maintaining the ciphertext data in the production environment further comprises executing production environment code that generates cleartext data and removes the cleartext data. In some arrangements, the cleartext data generated by the production environment code is encrypted with the homomorphic encryption function and stored in the production environment. In various arrangements, the homomorphic encryption function comprises manipulating cleartext data using a plurality of mathematical operators.

Some arrangements relate to a system with at least one processing circuit. The at least one processing circuit can be configured to maintain, in a production environment, encrypted data associated with a cryptographic function. Further, the at least one processing circuit can be configured decrypt, in the production environment, the encrypted data to generate cleartext data. Further, the at least one processing circuit can be configured encrypt the cleartext data using a homomorphic encryption function to generate ciphertext data. Further, the at least one processing circuit can be configured mask the ciphertext data using a masking function to generate alternate ciphertext data. Further, the at least one processing circuit can be configured decrypt the alternate ciphertext data to generate masked cleartext data and store, in a lower environment, the masked cleartext data.

In some arrangements, the encrypted data is the cleartext data that is encrypted using the cryptographic function in the production environment, and wherein the production environment is inaccessible to a party having control over the lower environment.

Figure 1:
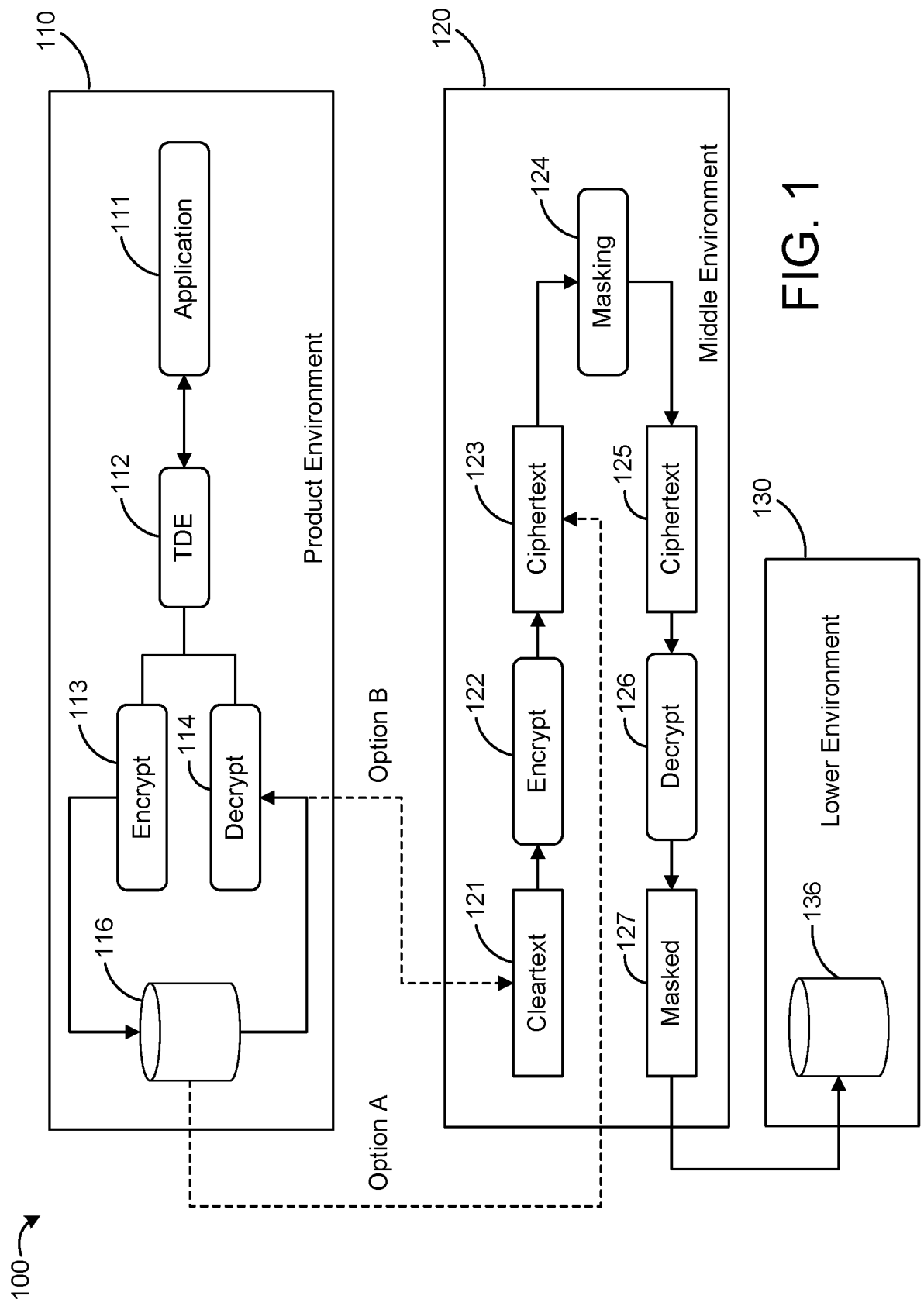
FIG. 1 is a block diagram depicting an example of a data protection architecture, according to some arrangements.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Conventional systems store sensitive information in a production environment that can be utilized to execute production software to perform daily business practices. The sensitive information may also be utilized to perform testing (e.g., regression, integration testing, system testing, and so on) to ensure daily business practices are not adversely affected when modification to production software occur. However, performing tests may occur in a non-production environment.

In many systems, production data (e.g., sensitive data—deoxyribonucleic acid (DNA), social security numbers (SSN), passport number, financial account number, other personal identifying information, and so on) is transferred (e.g., via a network) into lower environments for testing purposes. Oftentimes, lower environments have weak security and privacy controls, and the transferring of unencrypted, plaintext production data can often pose risk to exposure and compromisation of the production data. That is, the decrypted production data being transferred into lower environments can expose the underlining sensitive data, thus increasing the risk to compromisation of the production data. Further, the transferring of unencrypted, plaintext production data can also compromise production keys, because production keys may be utilized in lower environment that has weak key management controls.

In some arrangements, the ability to transfer production data from a production environment to a lower environment by obfuscating the production data, such as utilizing a homomorphic encryption model, provides increased security of production data without exposing production keys. By using a homomorphic encryption model, aspects of this technical solution can eliminate the exposure of production data over the network and in the lower environment, which is a significant improvement over other encryption models. This not only protects production data from compromisation, but also protects production keys from exposure, which is a significant improvement to the security of computing systems.

Accordingly, the present disclosure is directed to systems and methods for protecting data utilizing a homomorphic encryption model. In some arrangements, the casual obfuscation of data can include maintaining, decrypting, encrypting, masking and decrypting again based on a homomorphic encryption model. In particular, the homomorphic encryption model is based on masking encrypted text (e.g., ciphertext) and creating an alternate encrypted text for decryption such that exporting the encrypted text into a lower environment does not put the original cleartext (e.g., human readable text) or database keys at risk. In some arrangements, the described systems and methods involve utilizing one or more processing circuits that maintain encrypted data associated with a cryptographic function. The one or more processing circuits can then decrypt the encrypted data to generate cleartext data that can be encrypted utilizing a homomorphic encryption function to generate ciphertext data. In the present disclosure, once the data has been encrypted utilizing a homomorphic encryption function, the ciphertext data can be masked and decrypted such that it can be stored in a lower environment.

In some arrangements, the production environment data (also referred to herein as production data) may be inaccessible to a party having control (e.g., access) over the lower environment. In one example, an operations team (e.g., first party) in charge of daily business practices (e.g., executing one or more applications to provide services or products to customer) may have access to the production data in the production environment. Further, in this example, there may also be a test team (e.g., second party) in charge of improving, patching, and testing versions of one or more applications such that the operations team can perform daily business practices smoothly and without issues. However, in this example, the test team may require pseudo-production data (e.g., masked cleartext production data) to perform various operations (e.g., regression testing, unit testing, integration testing, smoke testing, acceptance testing, and so on) on various versions of one or more applications. Accordingly, the homomorphic encryption model described herein enables test teams to perform various operations utilizing masked cleartext data without exposing production data to the test team or the lower environment, thereby improving data protection architectures.

Referring now to FIG. 1, a block diagram depicting an example of a data protection architecture 100 is shown, according to some arrangements. The data protection architecture 100 is shown to include a production environment 110, a production database 116, a lower environment 130, a lower database 136, a middle environment 120, computing operations (e.g., indicated using rounded blocks—111, 112, 113, 114, 122, 124, and 126, collectively referred to herein as "operations"), and types of data (e.g., indicated using sharp blocks—121, 123, 125, 127). In some arrangements, the data protection architecture can be implemented utilizing a cryptographic function (e.g., symmetric encryption, asymmetric encryption, hashing, and so on).

In various arrangements, the data protection architecture 100 has a three-environment structure. The first environment can be referred to as the "production environment" (e.g., computing system) such that all data and operations performed on data within the production environment 110 is protected against unauthorized access utilizing conventional technical measures, such as but not limited to, a firewall, endpoint protection, and so on. The second environment can be referred to as the "lower environment" (e.g., different computing system) such that all data within the lower environment 130 is vulnerable and can have weaker access and key controls. In some arrangements, the lower environment 130 can have one or more processing circuits that can be utilized for, but is not limited to, development, proof of concept, unit testing, system testing, quality assurance, and so on. The lower environment 130 may also be accessed by, but is not limited to, developers, administrators, testers, and so on. In various arrangements, the one or more processing circuits of the lower environment 130 can execute software (e.g., an application) such as, but not limited to, test software, beta software, release candidate software, and so on. In some arrangements, one user may have multiple roles (e.g., database administrator, system administrator, application administrator, and so on) and the lower environment 130 may have weaker access such that there is uncontrolled sharing of data. Further, the lower environment 130 may have equipment and/or software (e.g., memory, storage, processors, security software, network protocols, and so on) that may be less costly than that of the production environment 110. That is, the production environment 110 may have distinct separation of duties (e.g., one role), cryptographic hardware (e.g., secure cryptoprocessor, cryptographic accelerator, hardware security module, hardware-based full disk encryption, and so on), and costly monitoring tools. For example, the production environment 110 and the lower environment 130 may use different cryptographic keys. The third environment can be referred to as the "middle environment" (sometimes referred to as "quasi-production") that can include similar features and functionality as the production environment 110. In some arrangements, the middle environment can have equivalent access and controls including, for example, a hardware security module (HSM) that can manage cryptographic keys. In one example, the middle environment 120 can utilize the same processing circuits as the production environment 110 and can be part of the same computing system. In another example, the middle environment 120 may be a privacy proxy that can securely communicate and securely transfer data to/from the production environment 110 over a secure network (e.g., secure VPN connection, secure wired connection, and so on) utilizing a secure network protocol (e.g., Secure Shell (SSL), Kerberos, IPSec, Secure Sockets Layer (SSL), HyperText Transfer Protocol Secure (HTTPS), and so on).

In various arrangements, a user can have an account associated with a username and password or other credentials. Using the username and credentials the user can gain access to the production environment 110, middle environment 120, and/or lower environment 130.

Permissions associated with a user can be used to determine the data that a user has access to. That is, permissions can be used to define the access level each user has. For example, production data can be generated that is only accessible to users that have access to the production environment 110. In various arrangements, the one or more processing circuits of the environments (e.g., 110, 120, 130) can use a multi-factor authentication and predefined access permission levels to guarantee that no user gets access to functionalities or data beyond the permission access level(s) assigned to that user. In some arrangements, access can be environment specific such that each environment (e.g., 110, 120, and 130) can have separate and distinct accounts. For example, an account utilized to access the lower environment 130 cannot be utilized to access the production environment 110. In this example, access would be denied if the account utilized to access the lower environment 130 is utilized to try and access the production environment 110. In various arrangements, a user may have an account for one or more environments (e.g., 110, 120, and 130) such that the user may access one or more environments utilizing a different account (each with a different username and password). In some arrangements, a user may have a universal account for all environments (e.g., 110, 120, and 130), such that the user may access one or more environments utilizing a single account. However, the users universal account may have different access levels for each environment.

In various arrangements, the one or more processing circuits of the middle environment 120 can communicate, over a communication network (e.g., network 250 in FIG. 2), with either the one or more processing circuits of the production environment 110 or one or more processing circuits of the lower environment 130. However, in some arrangements, it should be understood that the one or more processing circuits of the middle environment 120 may communicate with one environment (e.g., 110, 130) at any given time such that security and access of the underlining sensitive data (e.g., production data) can be maintained. Further in some arrangements, the environments might be "air-gapped" such that data must be manually transported using portable media such as disk drives, tapes, or other electronic storage. In some arrangements, the middle environment 120 may have a short time-to-live (TTL, sometimes referred to as hop limit) such that the one or more processing circuits of the middle environment 120 may limit the lifespan and/or lifetime of data. In comparison, the lower environment 130 may not discard data, and/or may not discard data until it receives a user command. That is, a short TTL can limit the data utilized by the one more processing circuits of the middle environment 120 (e.g., encrypted data, decrypted data, masked data, and so on) to specific timespans, data utilization requirements, and/or specific processes, such that when a specific timespan has elapsed, the data is not being utilized, and/or a specific process is executed, the data can be discarded (e.g., wiped, erased, removes, and so on). In various arrangements, the middle environment 120 can include similar features and functionality (e.g., security controls—HSM, strong passwords) as the production environment 110. In some arrangements, a user may have a dedicated account for the middle environment 120 such that the user's dedicated account may not have access to the production environment 110 or the lower environment 130. The one or more processing circuits of the middle environment 120 can actively monitor (e.g., constantly monitor, monitor all the time) the middle environment 120 such as, but is not limited to, logging all access, logging all import and exported data, checking logs frequently (e.g., every minute, hourly) for discrepancies (e.g., incorrect passwords entered, data that could potentially include malware, access to certain files by unidentified users, and so on). In some arrangements, the middle environment 120 can have a separate log system and/or special identifier associated with each log (e.g., file type—".log"). In various arrangements, the one or more processing circuits of the middle environment 120 may have limited network access, no internet, no wireless internet, no printers, no emails, and so on.

In some arrangements, the data protection architecture 100 can be executed on one or more processing circuits, such as those described below in detail with reference to FIG. 1. Referring to both FIGS. 1 and 2, the one or more processing circuits can include a microprocessor, an application specific integrated circuit (ASIC), a field-programmable gate array (FPGA), and so on, or combinations thereof. A memory can include, but is not limited to, electronic, optical, magnetic, or any other storage or transmission device capable of providing processor with program instructions. Instructions can include code from any suitable computer programming language.

In various arrangements, the one or more processing circuits can execute an application 111 in production environment 110. The application 111 can be software configured to provide one or more services (utilizing the production data) to one or more external parties (e.g., customers) of a provider institution. That is, the provider institution can develop, design, or otherwise configure the application 111 for one or more services. That is, the one or more services, such as music service, ride sharing service, travelling service, consulting service or financial service, and so on for example, can be software included in application 111. The application 111 can perform or facilitate the performance of an action associated with a service. For example, the financial service can provide a financial agreement (e.g., e.g., loans, transactions, contracts, non-disclosure, partnership, transfer, and so on) to a computing device via the application 111. In various arrangements, the application 111 may request access and/or have continuous access to production data in the production database 116.

The transparent data encryption 112 (shown in FIG. 1 as TDE 114 and collectively referred to herein as "TDE 112") can be an encryption model configured to protect the data (e.g., production data) in the production database 116 by encrypting the underlying files (also referred to herein as data structures) of the production database 116, and not the data itself. The TDE 112 encryption model can prevent the data from being hacked and copied to another server. Accordingly, in order to access and open files in the production database 116 a person must have access, the original encryption function, and a master key.

In some arrangements, the one or more processing circuits of the production environment 120 can execute a cryptographic function to manipulate cleartext in encryption operation 113 (shown in FIG. 1 as Encrypt 113). For example, cleartext may be utilized during execution of Application 111 and modified by TDE 112, but can be stored as ciphertext in production database 116 during periods of time when the Application 111 is not executing. In this example, the production database 116 can store ciphertext data (e.g., encrypted cleartext data) based on manipulating cleartext with encryption operation 113. In various arrangements, the one or more processing circuits of the production environment 120 can execute a decryption function (e.g., based on cryptographic function utilized to encrypt the cleartext) to manipulate ciphertext in decryption operation 114 (shown in FIG. 1 as Decrypt 114). For example, one or more processing circuits may receive a request for cleartext production data from application 111. In this example, the production database 116 can provide cleartext data (e.g., decrypted ciphertext data) based on manipulating ciphertext with decryption operation 114.

In some arrangements, the production environment 110 can include a production database 116. The production database 116 can utilized to store production data. In various arrangements, some of the production data can be encrypted by an encryption operation 113 utilizing a cryptographic function. For example, the cryptographic function could be a homomorphic encryption function. In other example, the cryptographic function could be any symmetric encryption function (e.g., Triple Data Encryption Standard (TDES), RCS, Advanced Encryption Standard (AES), Blowfish, CAST, and so on), and/or asymmetric encryption function (e.g. Rivest—Shamir-Adleman (RSA), Efficient and Compact Subgroup Trace Representation (ECSTR or XTR), Digital Secure, Escrowed Encryption Standard (EES), and so on).

Expanding generally on homomorphic encryption. In various arrangements, homomorphic encryption can include two environments, a data owner environment (DOE) and a third-party service provide (TPSP) environment. The DOE and TPSP environment can include one or more processing circuits, such as those described below in detail with reference to FIG. 7. That is, the TPSP environment can process encrypted data (e.g., ciphertext) without utilizing unencrypted data (e.g., cleartext). Also, the cleartext can be encrypted (e.g., deriving ciphertext) utilizing a homomorphic encryption function and the ciphertext to the TPSP environment. The TPSP environment can perform various functions (e.g., execute an Application that manipulates or utilizing the ciphertext) without having access to the cleartext. The altered cipher text can then be returned to the DOE and when decrypted (e.g., decryption operation), recovers the altered cleartext.

The production database 116 can be a database configured to store and/or maintain any of the information described herein. The production database 116 can maintain one or more data structures which can contain or index production data, application code, encryption code, decryption code, and/or database keys described herein. In one example, the production database 116 may store one or more encrypted data records. The production database 116 can be accessed using one or more memory addresses or index values. The production database 116 can be accessed by the components of the one or more processing circuits described herein (e.g., production environment system 210, lower environment system 230, data obfuscation modeler 222 described in detail with reference to FIG. 2) via a private communication network (not shown in FIG. 1). That is, the production database 116 may be in communication with one or more processing circuits of the production environment 110 via a private communication, in that the production database 116 is inaccessible (e.g., isolated form) from a lower environment 130. In some arrangements, the production database 116 can exist external to the production environment 110 and may be accessed via a communication network (e.g., network 250 in FIG. 2). The production database 116 can be distributed across many different computer systems or storage elements and may be accessed via the communication network or a suitable computer bus interface. The one or more processing circuits of the production environment 110 can store, in the production database 116, the results of any or all computations, determinations, encryptions, decryptions, selections, identifications, generations, constructions, or calculations in one or more data structures indexed with appropriate values, each of which may be accessed by the one or more processing circuits of the production environment 110 to perform any of the functionalities or functions described herein.

In various arrangements, the production database 116 includes various transitory and/or non-transitory storage mediums. The storage mediums may include but are not limited to magnetic storage, optical storage, flash storage, RAM, and so on. The one or more processing circuits can use various APIs to perform database functions (e.g., managing data stored in the production database 116). The APIs can be but are not limited to SQL, NoSQL, NewSQL, ODBC, JDBC, and so on.

Expanding generally on Option A and Option B, the one or more processing circuits of the middle environment 120 can be configured to receive a request for production data from one or more processing circuits of a lower environment 130. In some arrangements, the one or more processing circuits of the middle environment 120 can also be configured to query and retrieve production data from the production database 116. Accordingly, the middle environment 120 can perform various operations on the production data such that it can provide the lower environment 130 with manipulated production data that does not expose the cleartext or production keys. In some arrangements, the middle environment 120 can be included (e.g., utilizing the same processing circuits) in the production environment 110 such that all data and operations performed on data within the middle environment 120 can be considered protected against unauthorized access. In various arrangements, the middle environment 120 may be separate (e.g., proxy server) from the production environment 110 but can include similar systems and perform similar functions as the production environment 110. That is, the data and operations performed on data within the middle environment 120 can be considered protected against unauthorized access utilizing conventional technical measures, such as for example a firewall, or endpoint protection.

It should be noted that the terms "cleartext" or "plaintext" used herein, may refer to unencrypted production data (e.g., illustrated as "notverysecure," "ABCDE," and so on) that can be a human-readable sequence of characters. It should also be noted that the terms "ciphertext" or "cyphertext" used herein, may refer to encrypted production data (e.g., illustrated as "xQx2coV #Ng?r9," "Tj& #5," and so on) that can be unreadable by a human or computer without a proper cryptographic function (also referred to as a cipher) to decrypt the encrypted production data. Further, it should also be noted that the terms "masked" or "obfuscated" used herein, may refer to data structurally similar to cleartext or ciphertext data but can be inauthentic versions of cleartext or ciphertext data. For example, instead of "notverysecure," masked data may be illustrated as "notverysecure." In another example, instead of "Tj& #6," masked data may be illustrated as "Tj& #5."

Referring to Option B of system 100, an alternative arrangement to Option A, according to some arrangements. Generally, Option B can be utilized when the data stored in database 116 is encrypted with a different encryption function than a homomorphic encryption function. In various arrangements, the one or more processing circuits of the middle environment 120 can execute a decryption function (e.g., based on cryptographic function utilized to encrypt the cleartext) to manipulate the ciphertext in decryption operation 114 (shown in FIG. 1 as Decrypt 114). The decryption operation 114 can include utilizing a first symmetric key to manipulate the production data. That is, the manipulated production data that was previously encrypted (utilizing a cryptographic function) and stored in the production database 116, can be manipulated to generate cleartext data 121. For example, the decryption operation 114 can manipulate "7)4$nWFc=?v" (e.g., stored ciphertext) to derive "stagecoach" (e.g., cleartext 121).

In various arrangements, the one or more processing circuits of the middle environment 120 can execute a homomorphic encryption function (e.g., partially homomorphic, somewhat homomorphic, leveled fully homomorphic, fully homomorphic, and so on) to manipulate the cleartext 121 in an encryption operation 122 (shown in FIG. 1 as Encrypt 122). That is, the homomorphic encryption function can be utilized by the one or more processing circuits of the middle environment 120 to generate ciphertext 123. For example and with reference to the example above, the encryption operation 122 can manipulate "stagecoach" (e.g., cleartext 121) to derive "23WfO&!Lk35?" (e.g., ciphertext 123).

In some arrangements, the one or more processing circuits of the middle environment 120 can execute any suitable data masking algorithm to manipulate the ciphertext 123 in a masking operation 124 (shown in FIG. 1 as Masking 124 and sometimes referred to as bitmasking operations). Examples of the data masking algorithms can include but are not limited to, static data masking, statistical data obfuscation, on-the-fly data masking, dynamic data masking, and so on. In one example, the masking operation 124 may utilize a masking algorithm and perform bitwise operations (e.g., NOT, AND, NAND, OR, XOR, Complement, left-shift (logical or arithmetic), right-shift (logical or arithmetic), rotate right, rotate left, and so on) on the ciphertext 123 to derive alternate ciphertext 125 (shown in FIG. 1 as Ciphertext 125). For example and with reference to the example above, the masking operation 124 can manipulate "23WfO&!Lk35?" (e.g., ciphertext 123) by executing a rotate right bitwise operation to derive "?23WfO&!Lk35" (e.g., alternate ciphertext 125).

In various arrangements, the one or more processing circuits of the middle environment 120 can execute a decryption function (e.g., based on the homomorphic encryption function of encryption operation 122) to manipulate the alternate ciphertext 125 in decryption operation 126 (shown in FIG. 1 as Decrypt 126). The decryption operation 126 can include utilizing a second symmetric key (e.g., different from the first symmetric key) to manipulate the alternate ciphertext 125 to generate masked cleartext 127 (shown in FIG. 1 as Masked 127). For example and with reference to the example above, the decryption operation 126 can manipulate "?23WfO&!Lk35" (e.g., alternate ciphertext 125) to derive "Clydesdale" (e.g., masked cleartext 127). Accordingly, the one or more processing circuits of the middle environment 120 can provide (via a network, e.g., network 250 in FIG. 2) the masked cleartext 127 to the one or more processing circuits of a lower environment 130, and in particular, a lower database 136. The lower environment is described in further detail with reference to FIG. 2.

Referring now to Option A of system 100, an alternative arrangement to Option B, according to some arrangements. Option A resembles similar features and functionality, described in detail with reference to Option B of system 100. Generally, Option A can be utilized when the data stored in database 116 is encrypted with a homomorphic encryption function. That is, Option A is shown to include ciphertext 123, alternate cipher text 125, and masked cleartext 127, and execute the masking operation 124, and decryption operation 126. However, as shown, in some arrangements, the one or more processing circuits of production environment 110 may store homomorphically encrypted ciphertext (e.g., ciphertext 123) in production database 116. That is, the encryption operation 113 may perform a homomorphic encryption function on the production data before production data can be stored in production database 116. Accordingly, instead of decrypting (e.g., in the decryption operation 114) non-homomorphically encrypted ciphertext and encrypting (e.g., in the encryption operation 122) the cleartext 121 utilizing a homomorphic encryption function, in Option A, the one or more processing circuits of the middle environment 120 performs fewer computer operations contingent on the production database 116 already storing homomorphically encrypted ciphertext (e.g., ciphertext 123).

Figure 2:
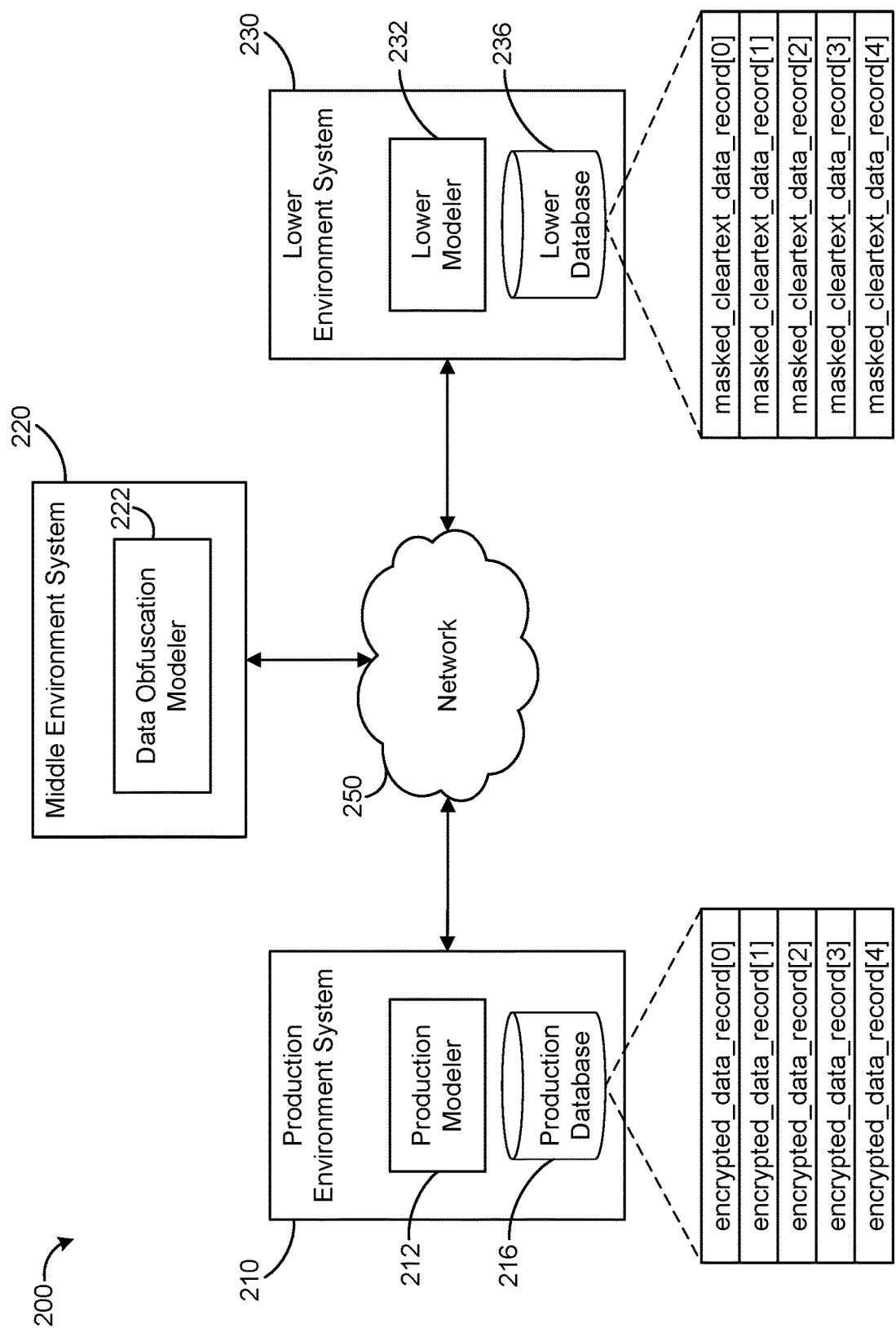
FIG. 2 is a block diagram depicting an example of a system for protecting data, according to some arrangements.

Referring now to FIG. 2, a block diagram depicting an example of a system 200 for protecting data is shown, according to some arrangements. The system 200 is shown to include a production environment system 210, a production modeler 212, a production database 216, a lower environment system 230, a lower modeler 232, a lower database 236, a middle environment system 220, a data obfuscation modeler 222, and a network 250. The network 250 may include a local area network (LAN), wide area network (WAN), a telephone network, such as the Public Switched Telephone Network (PSTN), a wireless link, a wired connection, an intranet, the Internet, or combinations thereof. The system 200 can also include at least one data processing system or processing circuit, such as production environment system 210, lower environment system 230, and/or middle environment system 220. The production environment system 210 can communicate via the network 250, for example with middle environment system 220, and/or lower environment system 230. The middle environment system 220 can communicate via the network, for example with production environment system 210, and/or lower environment system 230. A memory can include, but is not limited to, electronic, optical, magnetic, or any other storage or transmission device capable of providing processor with program instructions. Instructions can include code from any suitable computer programming language. In some arrangements, the production environment system 210 can include on one or more processing circuits, such as those described below in detail with reference to FIG. 7.

The production environment system 210 may be a computing device that is capable of receiving information (e.g., a symmetric key, an asymmetric key, a data request, a decrypted data record, an encrypted data record, a masked data record, and so on) and/or sending information (e.g., a symmetric key, an asymmetric key, a decrypted data record, an encrypted data record, a masked data record, and so on) to/from one or more computing devices (e.g., middle environment system 220, lower environment system 230, and so on) over network 250. A production environment system 210 may be any number of different types of computing devices, including without limitation, an application server, a catalog server, a communications server, a computing server, a database server, a file server, a game server, a mail server, a media server, a proxy server, a virtual server, a web server, or any other type and form of computing device or combinations of devices. It should be understood that various arrangements may include more, fewer, or different systems than illustrated in FIG. 2, and all such modifications are contemplated within the scope of the present disclosure.

In addition to the processing circuit, the production environment system 210 may include one or more databases (e.g., production database 216) configured to store data (e.g., encrypted_date_record[0], encrypted_date_record[1], encrypted_date_record[2], and so on). The production database 216 resembles similar features and functionality, described in detail with reference to FIG. 1, and in particular, production database 116.

The production environment system 210 may be configured to receive a request from a computing device (e.g., middle environment system 220, lower environment system 230, and so on) for one or more data records (e.g., production data). In some arrangements, the request may include an identifier to one or more data records and/or an identifier to a database (e.g., production database 216). For example, the middle environment system 220 may send a request to the production environment system 210 for the date in encrypted_data_record[0], where the request does not indicate the encrypted_data_record[0] is stored in production database 216. As another example, the middle environment system 220 may send a request to the production environment system 210 for the date in encrypted_data_record[0], where the request indicates the encrypted_data_record[0] is stored in production database 216. As another example, the middle environment system 220 may send a request to the production environment system 210 for the data associated with a particular data type (e.g., DNA, account numbers, addresses, SSN, and so on), where the request does not specifically identify a data record (e.g., encrypted_data_record[0]).

The production environment system 210 can include a production modeler 212. The production modeler 212 can be configured to execute various operations on production data. The production modeler 212 can be associated with and store a symmetric key pair. The symmetric key can be utilized to encrypt data (e.g., encryption operation 113 of FIG. 1), whereas the symmetric key can also be utilized to decrypt the encrypted data (e.g., decryption operation 114 of FIG. 1). That is, the symmetric key can be utilized to encrypt cleartext production data to generate ciphertext and to decrypt the ciphertext to generate cleartext production data.

In various arrangements, the production modeler 212 can encrypt production data utilizing a cryptographic function and a symmetric key before it can be stored in the production database. In some arrangements, the production modeler 212 can also decrypt encrypted production data using the symmetric key associated with the cryptographic function (e.g., AES-128, AES-192, AES-256, and so on) to recover the encrypted production data as cleartext production data.

The production modeler 212 can also be configured to execute an application associated with a production environment. The application could be instructions that include code from any suitable computer programming language such as, but not limited to, C, C++, C #, Java, JavaScript, VBScript, Perl, HTML, XML, Python, TCL, and Basic. Further the Application code, when executed by the one or more processing circuits of the production environment system 210, can utilize data stored in the production database 216 to perform various operations. For example, the production modeler 212 could execute one or more applications to perform, but not limited to, search functions (e.g., find all customers within one or more zip codes) sort functions (e.g., rank customers by zip code), computational functions (e.g., add net customer record), and/or update functions (e.g., change customer address).

The production modeler 212 can also be configured to perform transparent data encryption (TDE) on production data stored and/or extracted from the production database 216. For example, the production modeler 212 could perform TDE such as, but not limited to TDE decryptions (e.g., when reading records), TDE encryption (e.g., when writing records), and TDE key managements (e.g., backup keys, restore keys, rotate a key, generate new keys, terminate old keys, export keys, import keys, and so on).

The lower environment system 230 may be a computing device that is capable of receiving information (e.g., a symmetric key, a data request, a decrypted data record, an encrypted data record, a masked data record, and so on) and/or sending information (e.g., a symmetric key, a decrypted data record, an encrypted data record, a masked data record, and so on) to/from one or more computing devices (e.g., middle environment system 220, production environment system 210, and so on) over network 250. A middle environment system 220 may be any number of different types of computing devices, including without limitation, an application server, a catalog server, a communications server, a computing server, a database server, a file server, a mail server, a media server, a proxy server, a virtual server, a web server, or any other type and form of computing device or combinations of devices.

In addition to the processing circuit, the lower environment system 230 may include one or more databases (e.g., lower database 236) configured to store data (e.g., masked_cleartext_data_record[0], masked_cleartext_data_record[1], masked_cleartext_data_record[2], and so on). The lower database 236 resembles similar features and functionality, described in detail with reference to FIG. 1, and in particular, lower database 136.

The lower environment system 230 can include a lower modeler 232. The lower modeler 232 can be configured to execute various operations on masked cleartext data (e.g., pseudo-production data). The lower modeler 232 can be associated with and store a symmetric key. The symmetric key can be utilized to encrypt data, whereas the symmetric key can also be utilized to decrypt the encrypted data. However, the cryptographic keys of production environment system 210 may different than the cryptographic keys of lower environment system 230. That is, the cryptographic keys of the production environment system 210 can be restricted to the production environment 110 of FIG. 1, such that it may not be shared with any computing system outside of the production environment system 210, and as described in FIG. 1. Thus, the cryptographic keys of the lower environment system 230 can be different cryptographic keys for the one or more processing circuits of the lower environment system 230 to perform encryption and decryption.

The lower modeler 232 can also be configured to execute an application associated with a lower environment. The application could be instructions that include code from any suitable computer programming language such as, but not limited to, C, C++, C #, Java, JavaScript, VBScript, Perl, HTML, XML, Python, TCL, and Basic. Further the Application code, when executed by the one or more processing circuits of the lower environment system 230, can utilize data stored in the lower database 236 to perform various operations. In various implementations, the applications executed in lower modeler 232 can resemble similar features and functionality of the application executed in the production modeler 212.

System 200 can also include a middle environment system 220. The middle environment system 220 can be a computing device that is capable of receiving information (e.g., a symmetric key, a data request, a decrypted data record, an encrypted data record, a masked data record, and so on) and/or sending information (e.g., a symmetric key, a decrypted data record, an encrypted data record, a masked data record, and so on) to/from one or more computing devices (e.g., production environment system 210, lower environment system 230, and so on) over network 250. In some arrangements, the middle environment system 220 may have a direct connection to the production environment system 210. A middle environment system 220 may be any number of different types of computing devices, including without limitation, an application server, a catalog server, a communications server, a computing server, a database server, a file server, a game server, a mail server, a media server, a proxy server, a virtual server, a web server, or any other type and form of computing device or combinations of devices. In various arrangements, the middle environment system 220 can include a data obfuscation modeler 222. The data obfuscation modeler 222 can be configured perform various computer operations as discussed with reference to FIG. 1 (e.g., encryption operation 122, masking operation 124, decryption operation 126).

Figure 3:
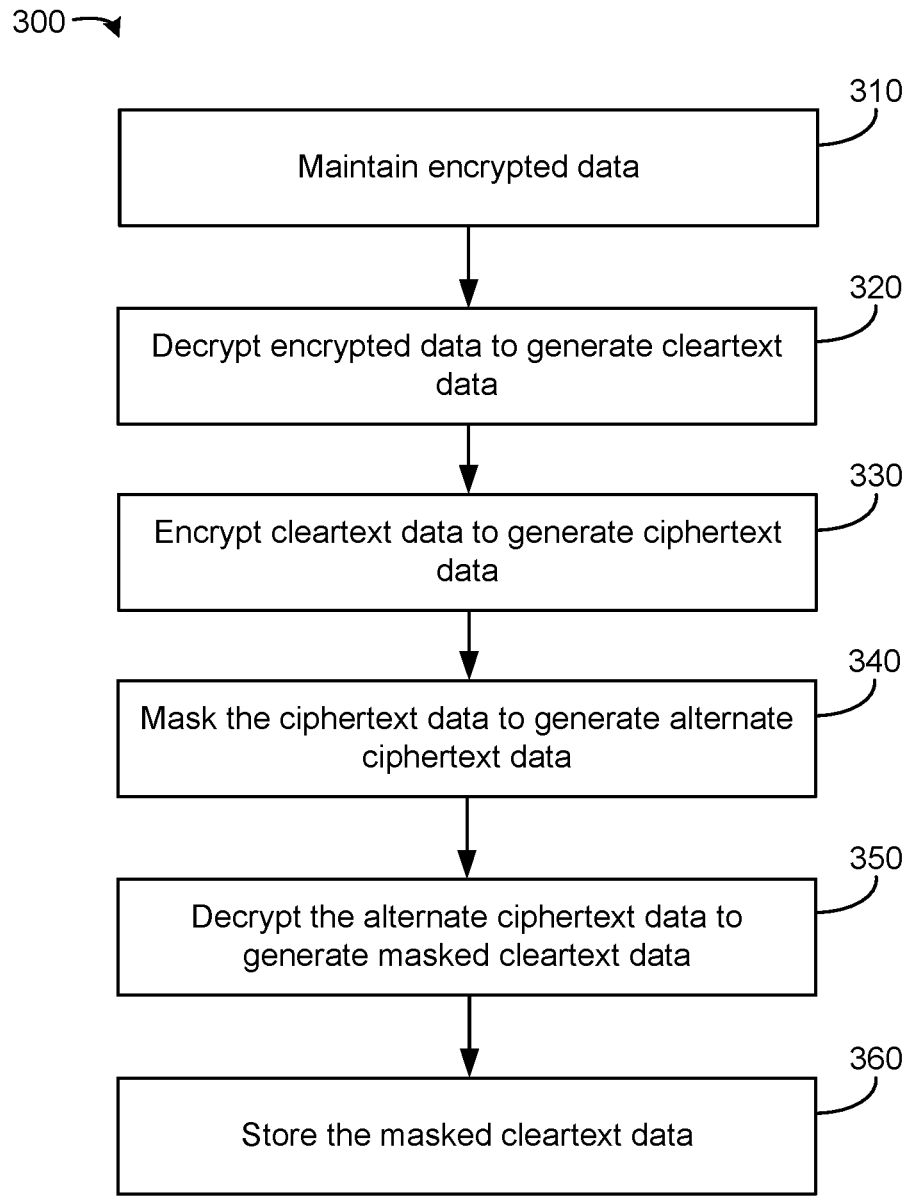
FIG. 3 is a flowchart for a method of protecting data, according to some arrangements.

Referring now to FIG. 3, a flowchart for a method 300 (e.g., Option B in FIG. 1) of protecting data is shown, according to some arrangements. The system 100 can be configured to perform the method 300. Further, any computing device described herein can be configured to perform the method 300.

In broad overview of the method 300, at block 310, the one or more processing circuits maintain the encrypted data. At block 320, the one or more processing circuits decrypt encrypted data to generate cleartext data. At block 330, the one or more processing circuits encrypt cleartext data to generate ciphertext data. At block 340, the one or more processing circuits mask the ciphertext data to generate alternate ciphertext data. At block 350, the one or more processing circuits can decrypt the alternate ciphertext data to generate masked cleartext data. At block 360, the one or more processing circuits store the masked cleartext data. Additional, fewer, or different operations may be performed in the method depending on the particular arrangement. In some arrangements, some or all operations of method 300 may be performed by one or more processors executing on one or more computing devices, systems, or servers. In some arrangements, method 300 may be performed by one or more environment systems (e.g., production, middle, and/or lower) such as middle environment 120 in FIG. 1. Each operation may be re-ordered, added, removed, or repeated.

Referring to method 300 in more detail, at block 310, the one or more processing circuits (e.g., production environment 110, and/or middle environment 120 in FIG. 1) maintain, in a production environment, encrypted data associated with a cryptographic function. In some arrangements, the production environment can be identical or substantially similar to the production environment 110 in FIG. 1 and/or production environment system 210 in FIG. 2. The encrypted data can be cleartext data that can be encrypted using a cryptographic function and a first cryptographic key (e.g., symmetric, asymmetric, and so on). In various arrangements, the encrypted data may be stored in a database and may be considered sensitive data (e.g., production data). For example, sensitive data can include, but is not limited to, social security numbers, passport number, personal identifying information, account security questions, biometric information, geolocation data indicating one or more locations of a person, photographs of people, criminal records, credit and/or payment card numbers, health data, and so on. In some arrangements, maintaining the encrypted data can include storing the data in a database and providing data security.

In some arrangements, maintaining the encrypted data can also include sorting the encrypted data by one or more characteristics in a database. In various arrangements, maintaining the encrypted data can also include performing one or more operations on the encrypted data (e.g., encryption, decryption, tokenization, sending, receiving), and executing code of one or more applications to manipulate and utilize the data to perform various computing tasks. Various computing tasks can include, but is not limited to, payment processing tasks (e.g., add charges to a credit card balance, compute interest applied, subtract payments to a credit/debit card, and so on), provider account tasks (e.g., add deposits to provider accounts, subtract withdrawals from provider account, add earned interest to provider accounts, subtract fees from provider account, and so on), provider initialization tasks (e.g., open account, close account, issue new credit/debit card, replace lost or stolen credit/debit card, cash withdrawals at an ATM, mobile payment transfers, mobile wallet setup, and so on), provider service tasks (e.g., process loan application, assign interest rate, compute amortization schedule, process monthly payments, handle late payment fees, process early loan pay off, and so on), customer information tasks (e.g., add phone number, change address, assign beneficiary, process death notification, name change, and so on). In various arrangements, a type of encrypted data can include tokenized data. Tokenized data can be referred to herein as the process of substituting sensitive data (e.g., production data) with non-sensitive data equivalent, referred to as a token, that can have no extrinsic or exploitable meaning or value. The token can be a reference that maps back to the sensitive data through a tokenization system (e.g., one or more processing circuits). For example, the sensitive data could be a credit card number (e.g., 12345) and one or more processing circuits could substitute the credit card number with a random set of numbers (e.g., 4289348879432902) such that the tokenized credit card number (e.g., random set of numbers) can be utilized in the lower environment.

At block 320, the one or more processing circuits decrypt, in the production environment, the encrypted data to generate cleartext data. In various arrangements, the decryption can be performed in a middle environment (described in detail with reference to FIGS. 1-2) utilizing one or more processing circuits of the middle environment. In some arrangements, decrypting can be identical or substantially similar to the decryption operation 114 in FIG. 1. The encrypted data can be decrypted utilizing a first cryptographic key. For example, decryption may decrypt the encrypted data (e.g., "Mv9?") to generate cleartext data (e.g., "1852").

At block 330, the one or more processing circuits encrypt the cleartext data using a homomorphic encryption function to generate ciphertext data. In various arrangements, the encryption can be performed in a middle environment (described in detail with reference to FIGS. 1-2) utilizing one or more processing circuits of the middle environment. In some arrangements, encrypting can be identical or substantially similar to the encryption operation 122 in FIG. 1. The cleartext data can be encrypted utilizing a second cryptographic key (or a second shared key). In some arrangements, the second cryptographic key may not be the same as the first cryptographic key. For example, encryption may encrypt the cleartext data (e.g., "1852") to generate ciphertext data (e.g., "$wF3").

At block 340, the one or more processing circuits mask the ciphertext data using a masking function to generate alternate ciphertext data. In various arrangements, the masking can be performed in a middle environment (described in detail with reference to FIGS. 1-2) utilizing one or more processing circuits of the middle environment. In some arrangements, masking can be identical or substantially similar to the masking operation 124 in FIG. 1. The encrypted data can be masked utilizing a masking function (e.g., bitwise operator). For example, masking may mask the ciphertext data (e.g., "$wF3") to generate alternate ciphertext data (e.g., "3Fw$").

At block 350, the one or more processing circuits decrypt the alternate ciphertext data to generate masked cleartext data. In various arrangements, the decryption can be performed in a middle environment (described in detail with reference to FIGS. 1-2) utilizing one or more processing circuits of the middle environment. In some arrangements, decryption can be identical or substantially similar to the decryption operation 126 in FIG. 1. The alternate ciphertext data can be decrypted utilizing the second cryptographic key (and as disclosed at block 330). That is, the second cryptographic key can be utilized to encrypt the cleartext data as disclosed at block 330 and can be utilized to decrypt the alternate ciphertext data. For example, decryption may decrypt the alternate ciphertext data (e.g., "3Fw$") to generate masked cleartext data (e.g., "2018").

At block 360, the one or more processing circuits store, in a lower environment, the masked cleartext data. In various arrangements, the storing can be performed in a middle environment (described in detail with reference to FIGS. 1-2) utilizing one or more processing circuits of the middle environment. In some arrangements, one or more processing circuits of the lower environment may receive the masked cleartext data over a network (e.g., network 250 in FIG. 2) and subsequently store the masked cleartext in a database of the lower environment. In various arrangements, the production environment and middle environment may be associated with a particular party (e.g., institution, company, provider, a subgroup (e.g., particular division or team) of any of the institution, company, and/or provider). However, in some arrangements, the lower environment may be associated with a different party (e.g., different institution, different company, different provider, and/or a different subgroup (e.g., particular division or team) of any of the institution, company, and/or provider). That is, the production environment and/or middle environment may be inaccessible to a party having control over the lower environment. Further, the cleartext data associated with the first keys (e.g., cryptographic keys) can be inaccessible to the party having control over the lower environment. In one example, the production and/or middle environment may be associated with an operations team of a company, whereas the lower environment may be associated with a testing team of the company. Accordingly, the testing team does not have access to the cleartext data associated with the first keys (e.g., cryptographic keys). In another example, the production and/or middle environment may be associated with a healthcare team of a healthcare provider, whereas the lower environment may be associated with a training team of the healthcare provider. Accordingly, the training team does not have access to the cleartext data associated with the first keys.

Figure 4:
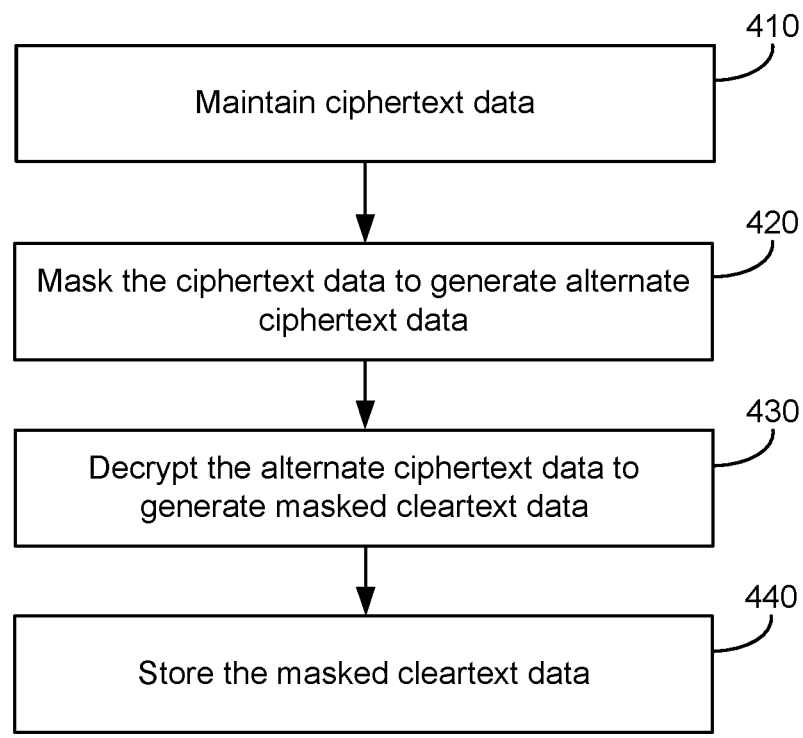
FIG. 4 is a flowchart for a method of protecting data, according to some arrangements.

Referring now to FIG. 4, a flowchart for a method 400 (e.g., Option A in FIG. 1) of protecting data is shown in FIG. 4, according to some arrangements. The system 100 can be configured to perform the method 400. Further, any computing device described herein can be configured to perform the method 400.

In broad overview of the method 400, at block 410, the one or more processing circuits maintain the ciphertext data. At block 420, the one or more processing circuits mask the ciphertext data to generate alternate ciphertext data. At block 430, the one or more processing circuits can decrypt the alternate ciphertext data to generate masked cleartext data. At block 440, the one or more processing circuits store the masked cleartext data. Additional, fewer, or different operations may be performed in the method depending on the particular arrangement. In some arrangements, some or all operations of method 400 may be performed by one or more processors executing on one or more computing devices, systems, or servers. In some arrangements, method 400 may be performed by one or more production environment systems, such as middle environment in FIG. 1. Each operation may be re-ordered, added, removed, or repeated.

Referring to method 400 in more detail, at block 410, the one or more processing circuits (e.g., production environment 110, and/or middle environment 120 in FIG. 1) maintain, in a production environment, ciphertext data associated with a homomorphic encryption function. At block 420, the one or more processing circuits mask the ciphertext data using a masking function to generate alternate ciphertext data. At block 430, the one or more processing circuits decrypt the alternate ciphertext data to generate masked cleartext data. At block 440, the one or more processing circuits store, in a lower environment, the masked cleartext data. Method 400 resembles similar features and functionality, described in detail with reference to method 300. However, in some arrangements, the one or more processing circuits of production environment 110 may store homomorphically encrypted ciphertext (e.g., ciphertext) in a database. Accordingly, instead of decrypting non-homomorphically encrypted ciphertext and encrypting the cleartext utilizing a homomorphic encryption function, method 400 enables the one or more processing circuits of the middle environment to perform fewer computer operations contingent on the database already storing homomorphically encrypted ciphertext (e.g., ciphertext).

Figure 5:
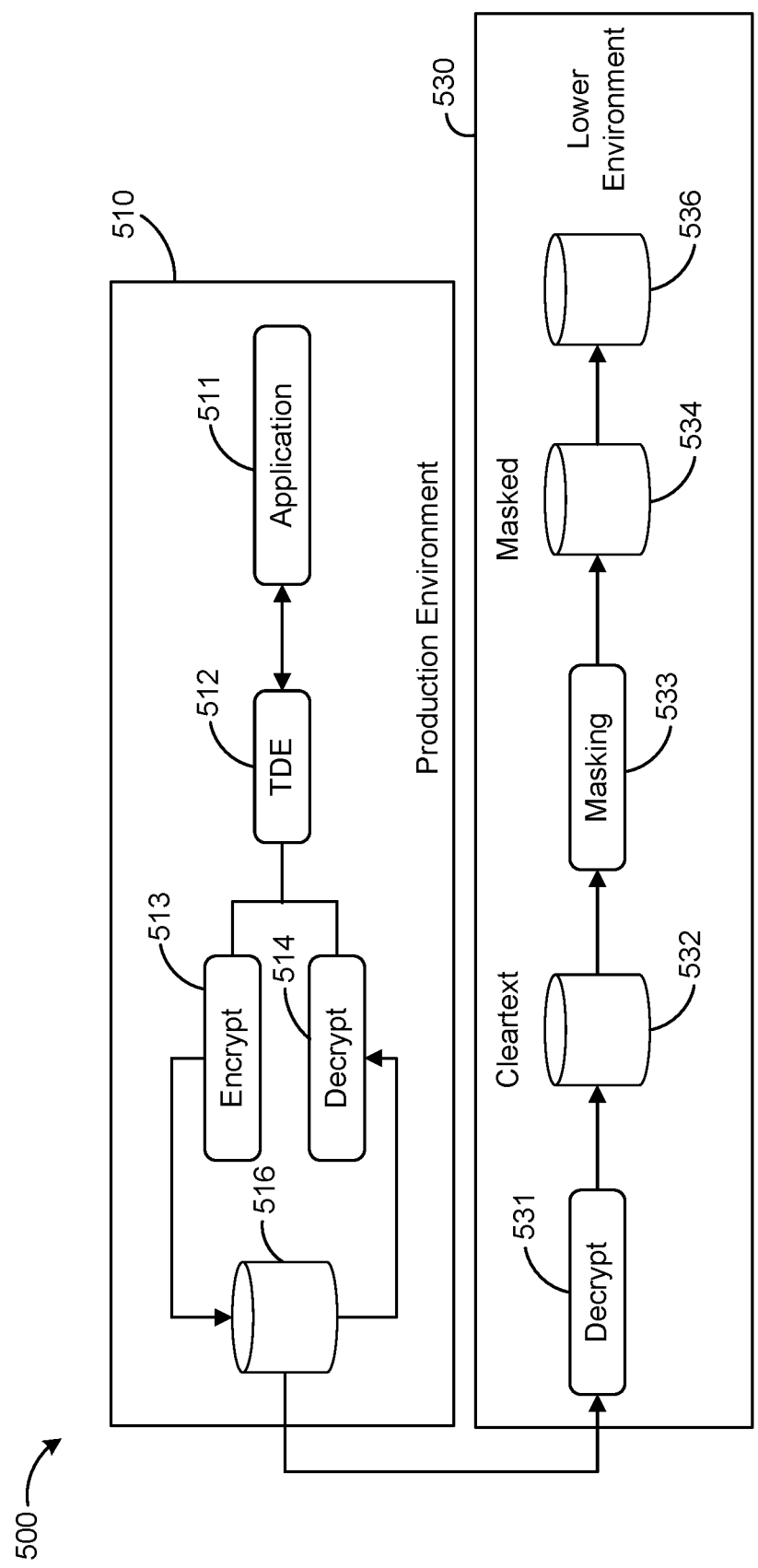
FIG. 5 is a block diagram depicting an example of a data protection architecture, according to some arrangements.

Referring now to FIG. 5, a block diagram depicting an example of a data protection architecture 500 is shown, according to some arrangements. The data protection architecture 500 resembles similar features and functionality described in detail with reference to FIG. 1. In particular, a production environment 510, a production database 516, a lower environment 530, a lower database 536, and computing operations (e.g., indicated using rounded blocks—511, 512, 513, and 514, collectively referred to herein as "operations"). However, instead of utilizing a middle environment 120 to export production data to a lower environment 130 as shown in FIG. 1, the data protection architecture 500 can export production data directly to the lower environment 530.

The production environment 510, described in detail with reference to production environment 110, can be configured to receive a request for production data from one or more processing circuits of the lower environment 530. In various arrangements, the one or more processing circuits of the lower environment 530 can retrieve encrypted production data (e.g., ciphertext) from the production database 516. The one or more processing circuits of the lower environment 530 can performing a decryption operation 531 (shown in FIG. 5 as Decrypt 531), resembling similar features and functionality of the decryption operation 114 described in detail with reference to FIG. 1. However, as shown, the decryption operation 531 is completed in the lower environment 530. Accordingly, the lower environment 530 can utilize a symmetric key associated with the encrypted production data to perform the decryption operation 531 to generate cleartext that can be stored in cleartext database 532. For example, the decryption operation 114 can manipulate "5n^$d3GnW4-@?sSwF2/72eRe" (e.g., stored ciphertext) to derive "together we'll go far" (e.g., cleartext).

In various arrangements, the cleartext stored in cleartext database 532 can be manipulated by a masking operation 533 (shown in FIG. 5 as Masking 533) utilizing the one or more processing circuits of the lower environment 530 to execute any suitable data masking algorithm. For example and with reference to the example above, the masking operation 533 can manipulate "together we'll go far" (e.g., cleartext stored in cleartext database 532) by executing three rotate left bitwise operation to derive "ether we'll go fartog" (e.g., masked cleartext). The masked cleartext can be stored in masked database 534 such that the one or more processing circuits can transfer the masked cleartext data to the lower database 536. Thus, as shown the data protection architecture 500 can put production data and production keys at risk due to lower environments weak security, access control, and key management (e.g., utilizing the symmetric key in both the production environment and lower environment). For example, the cleartext is being stored in cleartext database 532 which may not be considered secure and could pose risk to compromisation of production keys and sensitive production data. In another example, the lower environment is exposing/putting at risk the symmetric key that is also utilized in the production environment.

Figure 6:
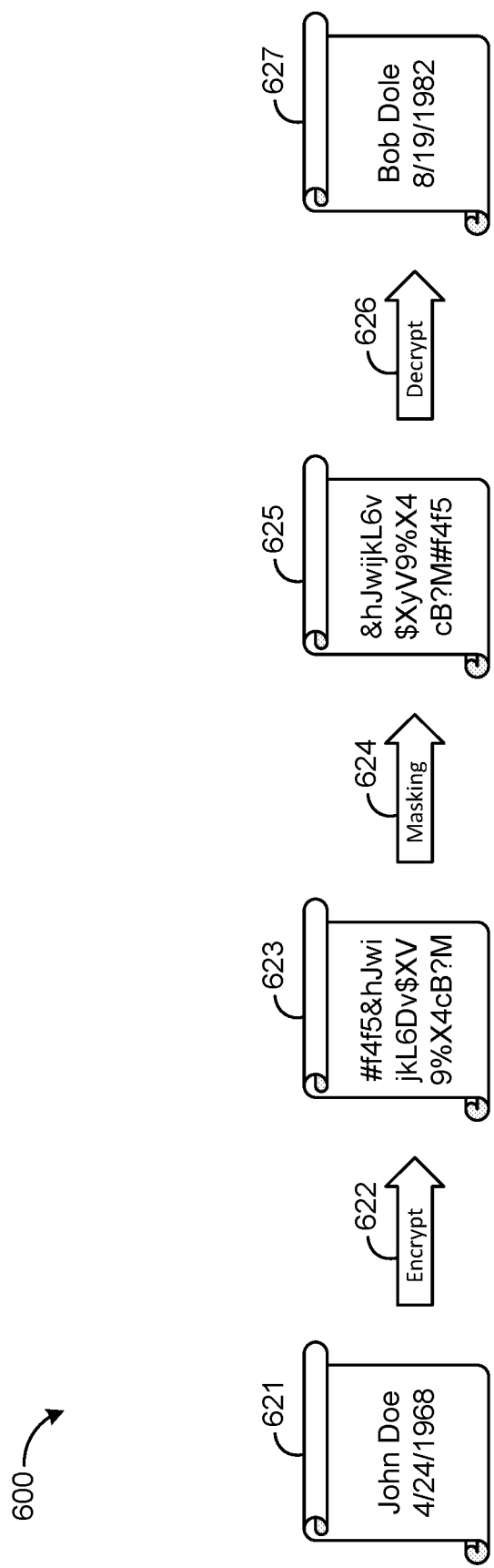
FIG. 6 is a block diagram depicting an example of production data obfuscation in connection with the data protection architecture of FIG. 1, according to some arrangements.

Referring now to FIG. 6, a block diagram depicting an example of production data obfuscation 600 in connection with the data protection architecture of FIG. 1 is shown, according to some arrangements. In some arrangements, "John Doe 4/24/1968" (e.g., cleartext 621) may be considered production data (e.g., sensitive data) that John and/or the provider institution may not want to be shared or accessed by unauthorized users. However, for example, a testing environment (e.g., lower environment) may desire to run tests on production data for a new and improved software release. Accordingly, the example of production data obfuscation 600 is shown to utilize a homomorphic encryption function to manipulate the cleartext 621 in an encryption operation 622 (shown in FIG. 6 as Encrypt 622). As shown, the encryption operation 622 manipulates "John Doe 4/24/1968" to derive "#f4f5&hJwijkL6Dv$XV 9% X4cB?M" (e.g., ciphertext 623. The ciphertext 623 can be subsequent masked utilizing any suitable masking algorithm to manipulate the ciphertext 623 in a masking operation 624 (shown in FIG. 6 as Masking 624). As shown, the masking operation 624 manipulates "#f4f5&hJwijkL6Dv$XV 9% X4cB?M" to derive ""&hJwijkL6Dv$XV 9% X4cB?M#f4f5" (e.g., alternate ciphertext 625). Further, the alternate ciphertext 625 can be subsequent decrypted utilizing a decryption function to manipulate the alternate ciphertext 625 in a decryption operation 626 (shown in FIG. 6 as Decrypt 626). As shown, the decryption operation 626 manipulates "&hJwijkL6Dv$XV 9% X4cB?M#f4f5" to derive "Bob Dole 8/19/1982" (e.g., masked cleartext 627). Accordingly, the testing environment can utilize the obfuscated production data to run tests to ensure the provider institutions daily business practices are not adversely affected by the new and improved software release, while also protecting John's sensitive data.

Figure 7:
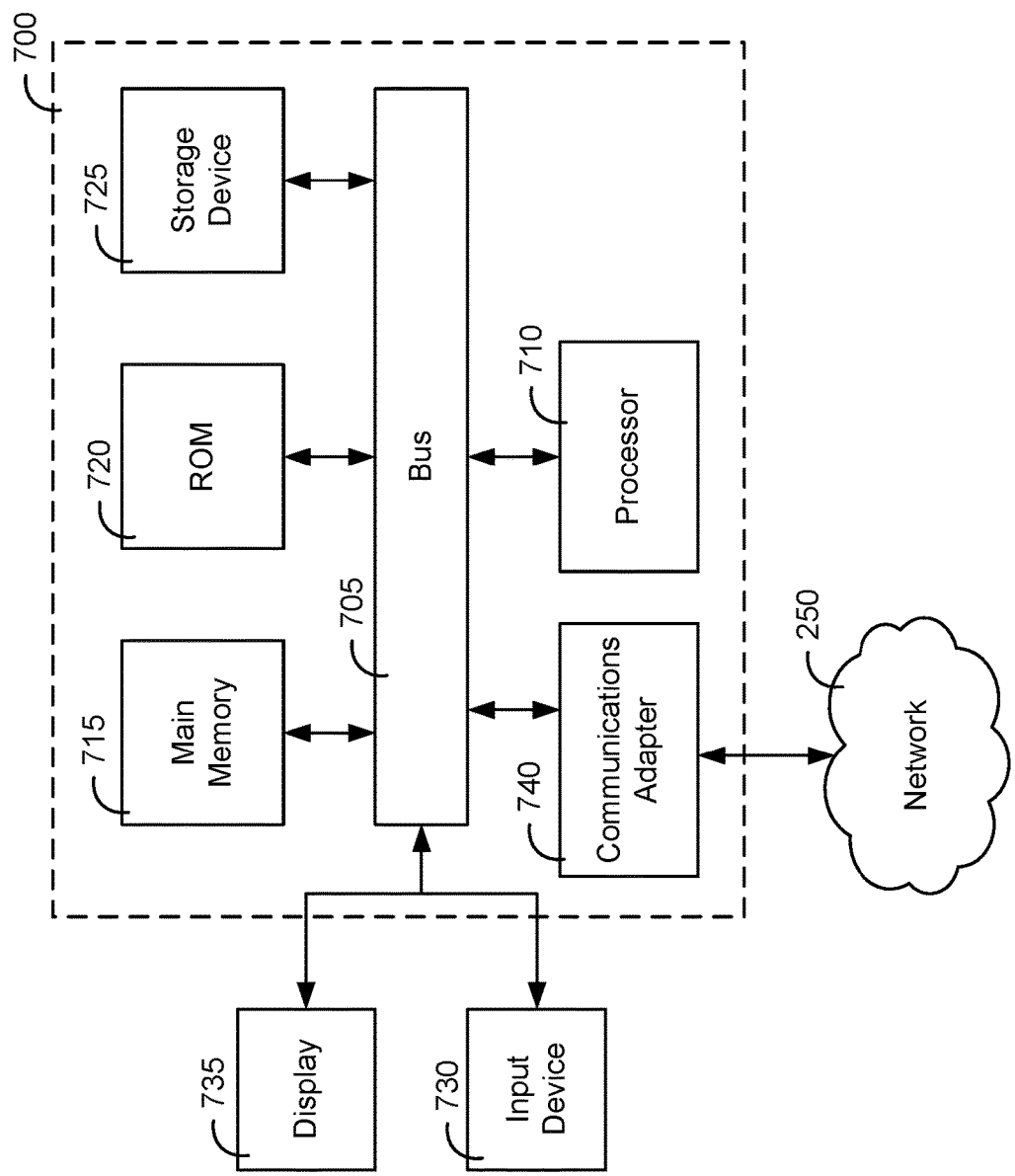
FIG. 7 is a block diagram illustrating an example computing system suitable for use in the various arrangements described herein.

FIG. 7 illustrates a depiction of a computer system 700 that can be used, for example, to implement an example production environment 110, an example middle environment 120, and example lower environment 130, an example production environment system 210, an example middle environment system 220, an example lower environment system 230, and/or various other example systems described in the present disclosure. The computing system 700 includes a bus 705 or other communication component for communicating information and a processor 710 coupled to the bus 705 for processing information. The computing system 700 also includes main memory 715, such as a random-access memory (RAM) or other dynamic storage device, coupled to the bus 705 for storing information, and instructions to be executed by the processor 710. Main memory 715 can also be used for storing position information, temporary variables, or other intermediate information during execution of instructions by the processor 710. The computing system 700 may further include a read only memory (ROM) 720 or other static storage device coupled to the bus 705 for storing static information and instructions for the processor 710. A storage device 725, such as a solid-state device, magnetic disk or optical disk, is coupled to the bus 705 for persistently storing information and instructions.

The computing system 700 may be coupled via the bus 705 to a display 735, such as a liquid crystal display, or active matrix display, for displaying information to a user. An input device 730, such as a keyboard including alphanumeric and other keys, may be coupled to the bus 705 for communicating information, and command selections to the processor 710. In another arrangement, the input device 730 has a touch screen display 735. The input device 730 can include any type of biometric sensor, a cursor control, such as a mouse, a trackball, or cursor direction keys, for communicating direction information and command selections to the processor 710 and for controlling cursor movement on the display 735.

In some arrangements, the computing system 700 may include a communications adapter 740, such as a networking adapter. Communications adapter 740 may be coupled to bus 705 and may be configured to enable communications with a computing or communications network 250 and/or other computing systems. In various illustrative arrangements, any type of networking configuration may be achieved using communications adapter 740, such as wired (e.g., via Ethernet), wireless (e.g., via WiFi, Bluetooth, and so on), satellite (e.g., via GPS) pre-configured, ad-hoc, LAN, WAN, and so on.

According to various arrangements, the processes that effectuate illustrative arrangements that are described herein can be achieved by the computing system 700 in response to the processor 710 executing an arrangement of instructions contained in main memory 715. Such instructions can be read into main memory 715 from another computer-readable medium, such as the storage device 725. Execution of the arrangement of instructions contained in main memory 715 causes the computing system 700 to perform the illustrative processes described herein. One or more processors in a multi-processing arrangement may also be employed to execute the instructions contained in main memory 715. In alternative arrangements, hard-wired circuitry may be used in place of or in combination with software instructions to implement illustrative arrangements. Thus, arrangements are not limited to any specific combination of hardware circuitry and software.

That is, although an example processing system has been described in FIG. 7, arrangements of the subject matter and the functional operations described in this specification can be carried out using other types of digital electronic circuitry, or in computer software embodied on a tangible medium, firmware, or hardware, including the structures disclosed in this specification and their structural equivalents, or in combinations of one or more of them. Arrangements of the subject matter described in this specification can be implemented as one or more computer programs, e.g., one or more subsystems of computer program instructions, encoded on one or more computer storage medium for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The terms "data processing system" or "processor" encompass all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more subsystems, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, arrangements of the subject matter described in this specification can be carried out using a computer having a display device, e.g., a quantum dot display (QLED), organic light-emitting diode (OLED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile input, or other biometric information. In addition, a computer can interact with a user by sending documents to and receiving documents from a device that is used by the user; for example, by sending web pages to a web browser on a user's client device in response to requests received from the web browser.

Arrangements of the subject matter described in this specification can be carried out using a computing system that includes a back-end component, e.g., as a data server, or that includes a middleware component, e.g., an application server, or that includes a front-end component, e.g., a client computer having a graphical user interface or a web browser through which a user can interact with an arrangement of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network 250. The relationship of client and server arises by virtue of computer programs running on the respective computers and having a client-server relationship to each other. In some arrangements, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some illustrative arrangements, the features disclosed herein may be implemented on a smart television circuit (or connected television circuit, hybrid television circuit, and so on), which may include a processing circuit configured to integrate Internet connectivity with more traditional television programming sources (e.g., received via cable, satellite, over-the-air, or other signals). The smart television circuit may be physically incorporated into a television set or may include a separate device such as a set-top box, Blu-ray or other digital media player, game console, hotel television system, and other companion device. A smart television circuit may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television circuit may be configured to provide a home screen or top-level screen including icons for a plurality of different applications, such as a web browser and a plurality of streaming media services, a connected cable or satellite media source, other web "channels," and so on. The smart television circuit may further be configured to provide an electronic programming guide to the user. A companion application to the smart television circuit may be operable on a mobile computing device to provide additional information about available programs to a user, to allow the user to control the smart television circuit, and so on. In alternate arrangements, the features may be implemented on a laptop computer or other personal computer, a smartphone, other mobile phone, handheld computer, a tablet PC, or other computing device.

While this specification contains many specific arrangement details, these should not be construed as limitations on the scope of the present disclosure or of what may be claimed, but rather as descriptions of features specific to particular arrangements of the present disclosure. Certain features that are described in this specification in the context of separate arrangements can also be carried out in combination or in a single arrangement. Conversely, various features that are described in the context of a single arrangement can also be carried out in multiple arrangements, separately, or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

Additionally, features described with respect to particular headings may be utilized with respect to and/or in combination with illustrative arrangement described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the arrangements described above should not be understood as requiring such separation in all arrangements, and it should be understood that the described program components and systems can generally be integrated together in a single software product or packaged into multiple software products embodied on tangible media.

Thus, particular arrangements of the subject matter have been described. Other arrangements are within the scope of the following claims. In some cases, the actions recited in the claims can be performed in a different order and still achieve desirable results. In addition, the processes depicted in the accompanying figures do not necessarily need the particular order shown, or sequential order, to achieve desirable results. In certain arrangements, multitasking and parallel processing may be advantageous.

What is claimed is:

1. A method of protecting data, the method comprising:
   maintaining, by a first processing circuit in a production database of a production environment system, ciphertext data associated with a cryptographic function, wherein the production environment system corresponds to a first access level;
   masking, by a second processing circuit in a middle environment system, the ciphertext data using a masking function to generate alternate ciphertext data, wherein the middle environment system is a proxy and communicably coupled with the production environment system over a secure network, wherein the ciphertext data is encrypted using the cryptographic function in the production environment system;
   decrypting, by the second processing circuit in the middle environment system, the alternate ciphertext data utilizing a symmetric key to generate masked cleartext data; and
   storing, by the second processing circuit in a lower environment system, the masked cleartext data in a lower database, wherein the lower environment system correspond to a second access level, wherein the first access level restricts access to the ciphertext data and the symmetric key to parties with the second access level having control over the lower environment system.

2. The method of claim 1, wherein the production environment system is inaccessible to a party having control over the lower environment system based on the first access level, and wherein the middle environment system is the proxy and communicably coupled with the lower environment system over a network.

3. The method of claim 2, wherein both the production environment system and the lower environment system are associated with a provider institution, and wherein the lower environment system is associated with applications available to external parties of the provider institution and the production environment system is associated with applications available to internal parties of the provider institution.

4. The method of claim 1, wherein a party having control over the lower environment system executes experiments utilizing the masked cleartext data based on the second access level.

5. The method of claim 1, wherein the masked cleartext data comprises a plurality of data structures, and wherein the ciphertext data is encrypted at a data structure level, the data structure level indicative of encrypting each individual data structure of the plurality of data structures.

6. The method of claim 1, wherein maintaining the ciphertext data in the production environment system further comprises executing production environment code that generates the ciphertext data and removes the ciphertext data.

7. The method of claim 6, wherein the ciphertext data generated by production environment code and is encrypted with a homomorphic encryption function based on manipulating cleartext data using a plurality of mathematical operators and storing the ciphertext data in the production environment system.

8. A system comprising:
   a first processing circuit configured to:
      maintain, in a production database of a production environment system, ciphertext data associated with a cryptographic function, wherein the production environment system corresponds to a first access level;
   a second processing circuit configured to:
      mask, in a middle environment system, the ciphertext data using a masking function to generate alternate ciphertext data, wherein the middle environment system is a proxy and communicably coupled with the production environment system over a secure network, wherein the ciphertext data is encrypted using the cryptographic function in the production environment system;
      decrypt, in the middle environment system, the alternate ciphertext data utilizing a symmetric key to generate masked cleartext data; and
      store, in a lower environment system, the masked cleartext data in a lower database, wherein the lower environment system correspond to a second access level, wherein the first access level restricts access to the ciphertext data and the symmetric key to parties with the second access level having control over the lower environment system.

9. The system of claim 8, wherein the production environment system is inaccessible to a party having control over the lower environment system based on the first access level, and wherein the middle environment system is the proxy and communicably coupled with the lower environment system over a network.

10. The system of claim 9, wherein both the production environment system and the lower environment system are associated with a provider institution, and wherein the lower environment system is associated with applications available to external parties of the provider institution and the production environment system is associated with applications available to internal parties of the provider institution.

11. The system of claim 8, wherein the party having control over the lower environment system executes experiments utilizing the masked cleartext data based on the second access level.

12. The system of claim 8, wherein the masked cleartext data comprises a plurality of data structures, and wherein the ciphertext data is encrypted at a data structure level, the data structure level indicative of encrypting each individual data structure of the plurality of data structures.

13. The system of claim 8, wherein maintaining the ciphertext data in the production environment system further comprises executing production environment code that generates the ciphertext data and removes the ciphertext data.

14. The system of claim 13, wherein the ciphertext data generated by production environment code and is encrypted with a homomorphic encryption function based on manipulating cleartext data using a plurality of mathematical operators and storing the ciphertext data in the production environment system.

15. One or more non-transitory computer-readable storage media having instructions stored thereon that, when executed by a plurality of processing circuits, cause the plurality of processing circuits to:
   maintain, by a first processing circuit of the plurality of processing circuits in a production database of a production environment system, ciphertext data associated with a cryptographic function, wherein the production environment system corresponds to a first access level;
   mask, by a second processing circuit of the plurality of processing circuits in a middle environment system, the ciphertext data using a masking function to generate alternate ciphertext data, wherein the middle environment system is a proxy and communicably coupled with the production environment system over a secure network, wherein the ciphertext data is encrypted using the cryptographic function in the production environment system;

decrypt, by the second processing circuit in the middle environment system, the alternate ciphertext data utilizing a symmetric key to generate masked cleartext data; and store, by the second processing circuit in a lower environment system, the masked cleartext data in a lower database, wherein the lower environment system correspond to a second access level, wherein the first access level restricts access to the ciphertext data and the symmetric key to parties with the second access level having control over the lower environment system.

16. The one or more non-transitory computer-readable storage media of claim 15, wherein the production environment system is inaccessible to a party having control over the lower environment system based on the first access level, and wherein the middle environment system is the proxy and communicably coupled with the lower environment system over a network.

17. The one or more non-transitory computer-readable storage media of claim 16, wherein both the production environment system and the lower environment system are associated with a provider institution, and wherein the lower environment system is associated with applications available to external parties of the provider institution and the production environment system is associated with applications available to internal parties of the provider institution.

18. The one or more non-transitory computer-readable storage media of claim 15, wherein the ciphertext data is encrypted using the cryptographic function in the production environment system, and wherein the ciphertext data is associated with the symmetric key.

* * * * *